US00RE50255E

(19) United States
(12) Reissued Patent
Kwak et al.

(10) Patent Number: US RE50,255 E
(45) Date of Reissued Patent: *Dec. 31, 2024

(54) MOBILE TERMINAL

(71) Applicant: LG ELECTRONICS INC., Seoul (KR)

(72) Inventors: Daeyong Kwak, Paju (KR); Sungjung Rho, Seoul (KR); Kangjae Jung, Seoul (KR)

(73) Assignee: LG ELECTRONICS INC., Seoul (KR)

( * ) Notice: This patent is subject to a terminal disclaimer.

(21) Appl. No.: 17/393,100

(22) Filed: Aug. 3, 2021

Related U.S. Patent Documents

Reissue of:
(64) Patent No.: 9,431,693
Issued: Aug. 30, 2016
Appl. No.: 13/161,418
Filed: Jun. 15, 2011

U.S. Applications:
(63) Continuation of application No. 16/025,691, filed on Jul. 2, 2018, now Pat. No. Re. 48,738, which is an application for the reissue of Pat. No. 9,431,693.

(30) Foreign Application Priority Data

Feb. 25, 2011 (KR) ..... 10-2011-0017410

(51) Int. Cl.
*H05K 7/00* (2006.01)
*H01Q 1/24* (2006.01)
(Continued)

(52) U.S. Cl.
CPC ..... *H01Q 1/243* (2013.01); *H01Q 5/371* (2015.01); *H01Q 7/00* (2013.01)

(58) Field of Classification Search
CPC ..... H01Q 1/243; H01Q 5/371; H01Q 7/00
See application file for complete search history.

(56) References Cited

U.S. PATENT DOCUMENTS 4,940,992 A 7/1990 Nguyen et al.
4,980,694 A * 12/1990 Hines ..... 343/702
(Continued)

FOREIGN PATENT DOCUMENTS

CN 1554137 12/2004
CN 1554137 A 12/2004
(Continued)

OTHER PUBLICATIONS

Chinese Office Action for Chinese Application No. 201110283371.1.
(Continued)

*Primary Examiner* — Linh M Nguyen
(74) *Attorney, Agent, or Firm* — Birch, Stewart, Kolasch & Birch, LLP

(57) ABSTRACT

Disclosed herein is a mobile terminal including a terminal body comprising a circuit board formed to process radio signals, a first and a second member configured to form an external appearance of the terminal and disposed to cover a lateral surface of the circuit board, a power feed connecting portion to allow the first member and the circuit board to be power feed connected, and a ground connecting portion to allow the first member and the circuit board to be ground connected. Accordingly, an electrical element and an antenna are disposed adjacent to each other, allowing the effective use of a space within the terminal.

21 Claims, 8 Drawing Sheets

(51) Int. Cl.
*H01Q 5/371* (2015.01)
*H01Q 7/00* (2006.01)

(56) References Cited

U.S. PATENT DOCUMENTS

| | | | | |
|---|---|---|---|---|
| 5,086,509 | A * | 2/1992 | Inubushi et al. | 455/575.8 |
| 5,557,293 | A | 9/1996 | McCoy et al. | |
| 5,710,987 | A * | 1/1998 | Paulick | 455/575.7 |
| 6,011,699 | A * | 1/2000 | Murray et al. | 361/814 |
| 6,054,954 | A * | 4/2000 | Eggleston et al. | 343/700 MS |
| 6,218,990 | B1 * | 4/2001 | Grangeat et al. | 343/700 MS |
| 6,329,949 | B1 * | 12/2001 | Barnett et al. | 343/700 MS |
| 6,753,818 | B2 * | 6/2004 | Wang | 343/702 |
| 6,940,460 | B2 * | 9/2005 | Maoz et al. | 343/702 |
| 7,088,295 | B2 * | 8/2006 | Komatsu et al. | 343/713 |
| 7,418,282 | B2 * | 8/2008 | Nuovo et al. | 455/575.8 |
| 7,605,764 | B2 * | 10/2009 | Ishimiya | H01Q 7/00 343/702 |
| 7,755,546 | B2 * | 7/2010 | Ishimiya | 343/702 |
| 7,801,577 | B2 * | 9/2010 | Lee | 455/575.1 |
| 8,138,980 | B2 * | 3/2012 | Imano et al. | 343/702 |
| 8,140,136 | B2 * | 3/2012 | Kim | 455/575.4 |
| 8,427,389 | B2 * | 4/2013 | Sakashita et al. | 343/878 |
| 8,600,462 | B2 * | 12/2013 | Kato | H01Q 1/36 455/90.3 |
| 2004/0046701 | A1 * | 3/2004 | Huber et al. | 343/702 |
| 2004/0137950 | A1 * | 7/2004 | Bolin et al. | 455/562.1 |
| 2007/0021159 | A1 * | 1/2007 | Kaneoya | 455/575.3 |
| 2007/0164910 | A1 * | 7/2007 | Qi et al. | 343/702 |
| 2007/0182658 | A1 | 8/2007 | Ozden | |
| 2007/0241971 | A1 * | 10/2007 | Tsujimura et al. | 343/702 |
| 2009/0197654 | A1 | 8/2009 | Teshima et al. | |
| 2009/0315785 | A1 * | 12/2009 | Yang | 343/702 |
| 2011/0001673 | A1 | 1/2011 | You et al. | |
| 2011/0053653 | A1 | 3/2011 | Tho et al. | |
| 2012/0039050 | A1 * | 2/2012 | Chang et al. | 361/749 |
| 2012/0129582 | A1 * | 5/2012 | Hongo et al. | 455/575.3 |

FOREIGN PATENT DOCUMENTS

| | | | |
|---|---|---|---|
| CN | 1642403 | | 7/2005 |
| CN | 1642403 | A | 7/2005 |
| CN | 1977425 | | 6/2007 |
| CN | 1977425 | A | 6/2007 |
| CN | 101944921 | | 1/2011 |
| CN | 101944921 | A1 | 1/2011 |
| JP | 2009-4875 | A | 1/2009 |
| JP | 2009004875 | A * | 1/2009 |
| KR | 10-2005-0032287 | A | 4/2005 |
| KR | 10-2011-0008606 | | 1/2011 |
| KR | 10-2011-0008606 | A | 1/2011 |
| WO | WO 2011/068674 | A2 | 6/2011 |

OTHER PUBLICATIONS

English Machine translation of Japanese publication 2009-4875.
European Search Report for European Application No. 11005565.4, dated Nov. 6, 2013.
English machine translation of Japanese publication 2006-129038.*
English machine translation of Japanese publication 2009-004875.*
English machine translation of Korean publication 10-2009-0066027 published Jan. 27, 2011.*
European Patent Office Application Serial No. 11005565.4, Search Report dated Nov. 6, 2013, 5 pages.
The State Intellectual Property Office of the People's Republic of China Application Serial No. 201110283371.1, Office Action dated May 6, 2014, 7 pages.

* cited by examiner

MOBILE TERMINAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[Pursuant to 35 U.S.C. §119(a), this application claims the benefit of earlier filing date and right of priority to Korean Application No. 10-2011-0017410, filed on Feb. 25, 2011, the contents of which is incorporated by reference herein in its entirety.]

*This application is a Continuation Reissue of U.S. patent application Ser. No. 16/025,691 filed on Jul. 2, 2018, now issued as U.S. Pat. No. RE48,738 on Sep. 14, 2021, which is a Reissue of U.S. application Ser. No. 13/161,418, issued as U.S. Pat. No. 9,431,693 on Aug. 30, 2016, which claims the priority benefit under 35 U.S.C. § 119(a) to Korean Patent Application No. 10-2011-0017410, filed in the Republic of Korea on Feb. 25, 2011, all of which are incorporated by reference into the present application. More than one reissue application has been filed for the reissue of U.S. Pat. No. 9,431,693. The reissue applications are U.S. application Ser. No. 17/393,100 (the present application), filed on Aug. 3, 2021, which is a continuation reissue of U.S. application Ser. No. 16/025,691 filed on Jul. 2, 2018, now issued as U.S. Pat. No. RE48,738.*

BACKGROUND OF THE INVENTION

1. Field of the Invention

The present disclosure relates to a mobile terminal having an antenna transmitting and receiving radio electromagnetic waves.

2. Description of the Related Art

Mobile communication services continue to be evolved by the development of mobile communication technologies along with the consumer's request for more various services. The early stage of mobile communication services was simply focused on voice communications. However, in recent years, various mobile communication services have come out, such as multimedia services such as music or cinema, wireless portable Internet services allowing the Internet to be used while moving, and satellite communication services providing mobile communications beyond national boundaries.

On the other hand, as an antenna of the mobile communication terminal is made smaller in a typical mobile communication terminal, the radiation efficiency of the antenna is reduced, the frequency band is decreased, and the antenna gain is reduced. However, the miniaturization, multifunction, and high performance of a mobile communication terminal are continuously required in spite of the decreased performances. Accordingly, the miniaturization and high performance of an antenna which is used in the mobile communication system is also required.

An antenna for the mobile communication terminal in the related art has a ¼ wavelength monopole or helical shape, which is protruded to the outside, thereby causing difficulty in the user's portability as well as having a rigidity problem.

In order to solve those problems, the studies for an embedded antenna have been actively carried out.

SUMMARY OF THE INVENTION

The present invention has been contrived to solve the foregoing problems, and an aspect of the present disclosure is to provide a mobile terminal having an antenna device with a more enhanced performance.

In order to accomplish the foregoing task, a mobile terminal associated with an example of the present invention may include a terminal body including a circuit board formed to process radio signals, a first radiator separated from the circuit board and disposed to be overlapped with the circuit board, a second radiator disposed adjacent to the first radiator, a first power feed connecting portion allowing the first radiator and the circuit board to be power feed connected, and a first ground connecting portion allowing the circuit board and the second radiator to be ground connected.

According to an example of the present invention, the first power feed connecting portion and the second ground connecting portion are electrically connected by an inductor.

Furthermore, in order to accomplish the foregoing task, according to the present invention, there is disclosed a mobile terminal including a display area formed to display visual information on a surface of the terminal body, a display panel disposed adjacent to an end portion of the terminal body to allow the display area to be extended to the end portion thereof, and an antenna portion overlapped with the display panel and formed to reduce a separation distance from the display panel, wherein the antenna portion includes a first radiator power feed connected to a circuit board and a second radiator disposed adjacent to the first radiator to be coupled therewith and ground connected to the circuit board.

Furthermore, in order to accomplish the foregoing task, according to the present invention, there is disclosed a mobile terminal including an antenna portion formed to radiate radio signals and a terminal body having an electrical ground, wherein the antenna portion includes a first radiator and a second radiator disposed and coupled adjacent to each other, a first power feed connecting portion formed to power feed the first radiator, and a first ground connecting portion formed to ground connect the second radiator to the electrical ground.

As described above, according to a mobile terminal associated with at least one embodiment of the present invention, two radiators are disposed adjacent to each other, thereby providing an antenna satisfying a multi-band characteristic even in a space having an effect caused by the circuit board or display panel within the terminal body.

Furthermore, due to this, it may be possible to secure economical efficiency through the miniaturization of the terminal and the simplification of the components.

As described above, according to a mobile terminal associated with at least one embodiment of the present invention, electrical elements and an antenna are disposed adjacent to each other, thereby allowing an effective use of the space within the terminal.

Furthermore, the primary radiation section is formed to be directed to the outside in the length direction from the bottom end, thereby reducing the deterioration of a radiation characteristic caused by an hand effect in a high-frequency band.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
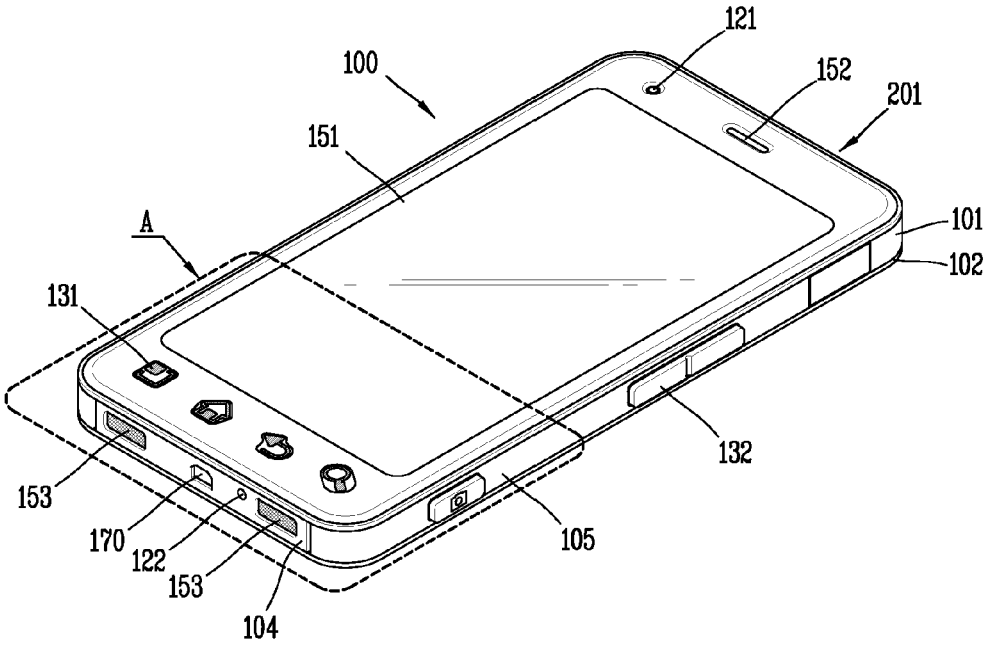
FIG. 1 is a front perspective view illustrating a front shape of a mobile terminal associated with an embodiment of the present invention.

Hereinafter, a mobile terminal associated with the present invention will be described in more detail with reference to the accompanying drawings. The suffixes "module" and "unit or portion" for components used in the following description merely provided only for facilitation of preparing this specification, and thus they are not granted a specific meaning or function. This specification employs like/similar reference numerals for like/similar components irrespective of different embodiments, so they all will be understood by the first description. The expression in the singular form in this specification will cover the expression in the plural form unless otherwise indicated obviously from the context.

A mobile terminal disclosed herein may include a portable phone, a smart phone, a laptop computer, a digital broadcast terminal, a personal digital assistant (PDA), a portable multimedia player (PMP), a navigation, and the like. However, it would be easily understood by those skilled in the art that a configuration according to the following description may be also applicable to a stationary terminal such as a digital TV, a desktop computer, and the like.

FIG. 1 is a front perspective view illustrating an example of the mobile terminal 100 associated with the present invention.

The mobile terminal 100 disclosed herein is provided with a bar-type terminal body. However, the present invention is not only limited to this, but also applicable to various structures such as a slide type, a folder type, a swivel type, a swing type, and the like, in which two and more bodies are combined with each other in a relatively movable manner.

The body includes a case (casing, housing, cover, etc.) forming an appearance of the terminal. In this embodiment, the case may be divided into a first case 101 and a second case 102. At least one middle case may be additionally disposed between the first case 101 and the second case 102.

The cases may be formed by injection-molding a synthetic resin or may be also formed of a metal material such as stainless steel (STS), titanium (Ti), or the like.

A display unit 151, an audio output module 152, a camera 121, a user input unit 131, 132, a microphone 122, an interface 170, and the like may be arranged on the terminal body, mainly on the first case 101.

The display unit 151 occupies a most portion of the main surface of the first case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the first case 101 and the second case 102.

The display unit 151 may display(output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transmission type or light transmission type to allow viewing of the exterior through the display unit, which may be called transparent displays. An example of the typical transparent displays may include a Transparent OLED (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have an interlayer structure, the structure may be referred to as a touch screen. The display unit 151 may be used as an input device rather than an output device. The touch sensor may be implemented as a touch film, a touch sheet, a touch pad, and the like.

The interface 170 may serve as an interface with all external devices connected with the mobile terminal. For example, the external devices may include a wired/wireless headset, an external power charger, a wired/wireless data port, a card socket (e.g., memory card, SIM/UIM card, etc.), and the like. The interface 170 may be used to receive data or power from an external device and deliver it to each element within the mobile terminal, or may be used to transmit data within the mobile terminal to the external device.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller.

The touch controller processes the received signals, and then transmits corresponding data to the controller. Accordingly, the controller may sense which region of the display unit 151 has been touched.

The user input unit is configured to receive a command for controlling the operation of the mobile communication terminal 100, and may include plurality of manipulation units 131, 132. The manipulation units 131, 132 may be commonly designated as a manipulating portion, and any method may be employed if it is a tactile manner allowing the user to perform manipulation with a tactile feeling.

The content inputted by the first and the second manipulation unit 131, 132 may be configured in various ways. For example, the first manipulation unit 131 may receive a command, such as start, end, scroll, or the like, and the second manipulation unit 132 may receive a command such as volume control of sound outputted from the audio output unit 152, switching into a touch recognition mode of the display unit 151, or the like.

Figure 2:
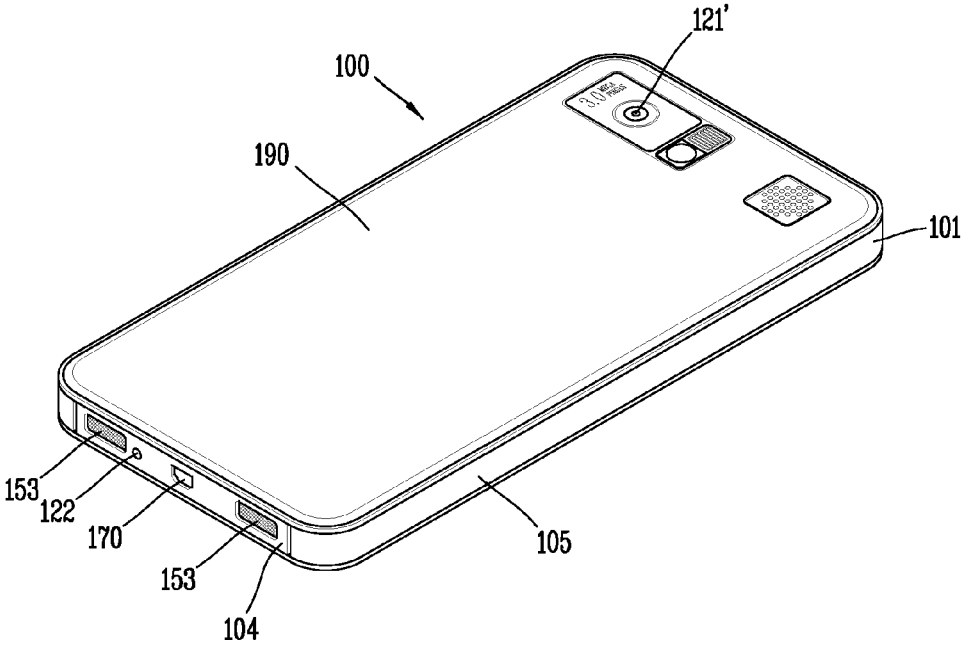
FIG. 2 is a rear perspective view illustrating the mobile terminal of FIG. 1.

FIG. 2 is a rear perspective view illustrating the mobile terminal of FIG. 1.

Referring to FIG. 2, a camera 121' may additionally be mounted on a rear surface, i.e. a second case 102 of the terminal body. The camera 121' has a capturing direction substantially opposite to that of the camera 121, and may have a different number of pixels from that of the camera 121.

For example, it is preferable that the camera 121 has a lower number of pixels to allow the user to capture the user's face and send it to another party in case of a video call or the like, and the camera 121' has a higher number of pixels to allow the user to capture a typical object but not to immediately send it. The cameras 121 and 121' may be provided in the terminal body in a rotatable or pop-up manner.

A flash and a mirror may be additionally disposed adjacent to the camera 121'. The flash emits light toward an object when capturing the object with the camera 121'. The mirror allows the user to reflect the user's own face when the user wants to capture himself or herself in a self-portrait mode using the camera 121'.

An audio output unit may be additionally disposed at a rear surface of the terminal body. The audio output unit may implement a stereo function together with the audio output unit 152, and may be used to implement a speakerphone mode during voice communication.

An antenna (not shown) for receiving a broadcasting signal in addition to an antenna for communication or the like may be additionally disposed at a lateral surface of the terminal body. An antenna constituting part of the broadcasting reception module may be provided in a retractable manner on the terminal body.

The power supply unit for supplying power to the mobile terminal 100 may be mounted on the terminal body. The power supply unit may be provided such that it is incorporated in the terminal body, or directly drawn out of the terminal body in a detachable manner. The power supply unit may be embedded by a battery cover 190.

A touch pad (not shown) for detecting a touch may be additionally mounted on the second case 102. The touch pad may be configured with a light transmission type similar to the display unit 151. In this case, if the display unit 151 is configured to output visual information from both surfaces thereof, then the visual information may be also recognized through the touch pad. All the information outputted to both surfaces thereof may be also controlled by the touch pad. On the contrary, a display unit may be additionally mounted on the touch pad, and thus a touch screen may be also disposed on the second case 102.

The touch pad may be operated in relation to the display unit 151 of the first case 101. The touch pad may be disposed in parallel to a rear side of the display unit 151. The touch pad may have the same or smaller size than the display unit 151.

Embodiment 1

Figure 3:
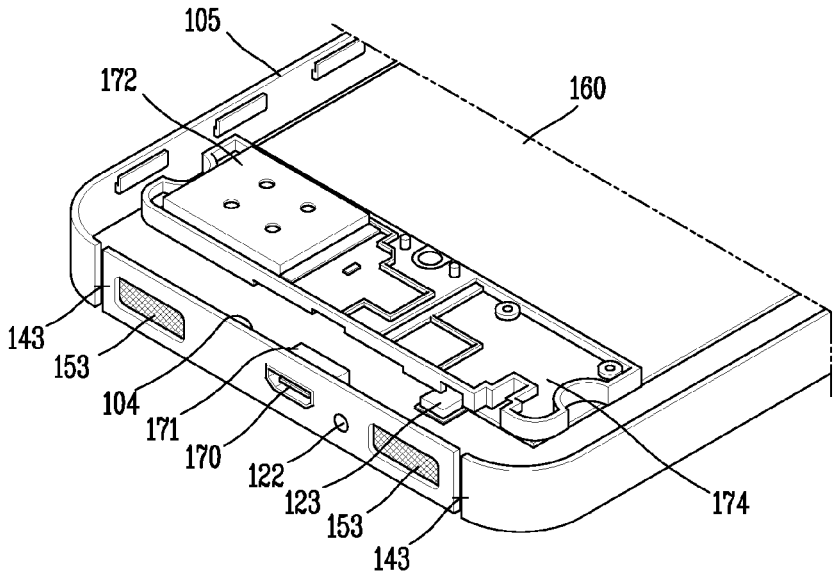
FIG. 3 is a perspective view illustrating a configuration in which a display unit is removed from the "A" portion of FIG. 1.
Figure 4:
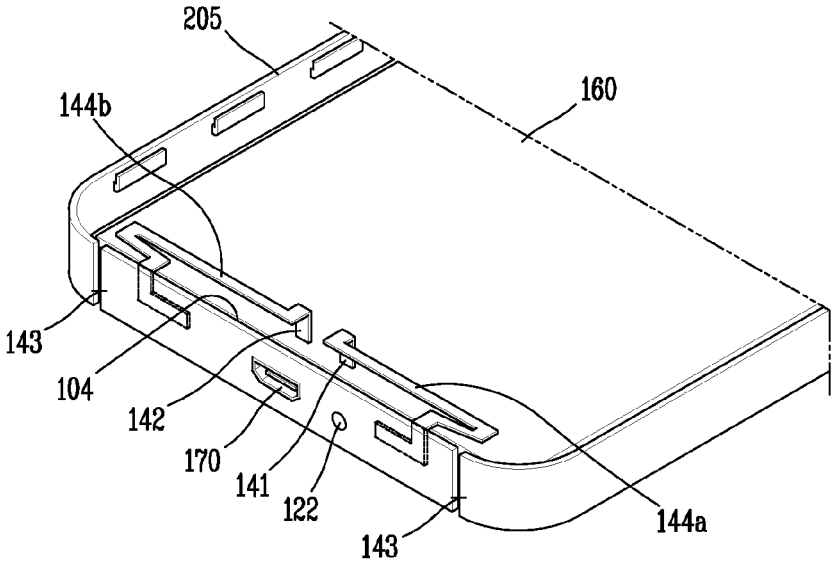
FIG. 4 is a conceptual view schematically illustrating the configuration of FIG. 3.

FIG. 3 is a perspective view illustrating a configuration in which a display unit is removed from the "A" portion of FIG. 1, and FIG. 4 is a conceptual view schematically illustrating the configuration of FIG. 3.

As illustrated in the drawing, a mobile terminal according to the present disclosure is a mobile terminal having a loop antenna, and the loop antenna uses a portion of the case formed along a lateral surface of the terminal body as part of a conductive loop. In other words, a loop antenna according to an embodiment of the present disclosure forms a closed loop together with a first member 104, a power feed connecting portion 141, a ground connecting portion 142, and a circuit board 160. The first member 104 and the second member 105 are part of a cover forming an external appearance of the terminal, and disposed to cover a lateral surface of the circuit board 160. The first member 104 may be formed by including a metal material, and operated as a main radiator in the loop antenna. Furthermore, at least part of the second member 105 is made of a conductive metal material to form another conductive loop.

The first member 104 and the power feed connecting portion 141 are connected to a first pattern 144a, and the first member 104 and the ground connecting portion 142 are connected to a second pattern 144b. The patterns are formed on a carrier 174. The first member 104, the second member 105 and the patterns are combined with one another to form a conductive loop operated at any one of a code division multiple access (CDMA) and global system for mobile (GSM) communication band (800-1000 MHz), a personal communication system (PCS) and digital cellular system (DCS) band (1700-1900 MHz), and a wideband CDMA (W-CDMA) communication band (2.4 GHz), securing sufficient band characteristics, respectively. The conductive loop may be formed to satisfy a half wavelength of a specific frequency.

The first pattern 144a and the second pattern 144b may have a conductor in a meander type, and the conductor may be fabricated in various forms according to the resonance or frequency characteristics. A current is power fed to the conductor through the power feed connecting portion 141, and a current power fed through the ground connecting portion 142 is short circuited.

A slit portion 143 is formed between the first member 104 and the second member 105 to separate them from each other. Due to this, the first member 104 may form a conductive loop together with the power feed connecting portion 141, the ground connecting portion 142, and the patterns. In other words, even if the second member 105 includes a conductive metal material, a current flow to the second member 105 may be blocked or a coupling effect thereon may be reduced to be operated as a loop antenna.

The power feed connecting portion 141 allows the first member 104 to be power fed by electrical connection (or electro-magnetic (EM) power feeding method), and the ground connecting portion 142 is ground connected to the first member 104 to be electrically shorted, thereby implementing antenna resonance frequency and impedance matching.

The power feed connecting portion 141 allows the first member 104 to be electrically connected to the power feeding device (not shown). For the connection thereof, the power feed connecting portion 141 may include a power feeding plate, a power feeding clip, and a power feeding line. Here, the power feeding plate, power feeding clip, and power feeding line are electrically connected to one another to transfer a current (or voltage) power fed through the power feeding device to a conductor of the radiating portion. Here, the power feeding line may include a microstrip printed on the substrate.

The ground connecting portion 142 allows an end of the first member 104 or second member 105 to be electrically connected to the electrical ground, thereby allowing the first member 104 or second member 105 to be grounded. The electrical earth may be a ground on the circuit board 160. Here, the ground connecting portion 142 may have at least two paths having a different length, and formed to have a switch corresponding to each path. Furthermore, each path allows the electrical earth and radiators (for example, a first member) to be connected with a different length in a selective manner. Here, the path may be an electrical pathway for connecting the earth to the radiator and may be formed by including a grounding plate, a grounding clip, and a grounding line. Furthermore, the grounding line may be formed with a different length, thereby providing a different length of the path.

As illustrated in FIG. 3, a speaker module 172, an interface module 171, or a microphone module 123 may be mounted at a location surrounded by the first member 104 and second member 105, and disposed adjacent to the first member 104. Furthermore, the speaker module 172, interface module 171, or microphone module 123 may be mounted on a carrier 174, and the carrier 174 may be disposed at the foregoing location.

At least one or holes communicated with the inner and outer portion of the body may be formed on the first member 104. A speaker 153 hole, an interface 170 housing, or a microphone 122 housing may be disposed on the hole.

In general, electrical elements are not mounted in a space obstructing the radiation efficiency of an antenna. However, when a portion of the case formed along a lateral surface of the terminal body as illustrated herein is used as part of a conductive loop, the electrical element and antenna may be disposed adjacent to each other to reduce efficiency deterioration, thereby allowing the effective use of a space within the terminal.

Modification of the Embodiment 1

FIG. 5A through 5H are conceptual views of a loop antenna according to an embodiment of the present invention, illustrating the modified embodiment of each antenna, respectively. The modification may be implemented by the embodiment 1 as well as the embodiment 2 which will be described later.

Figure 5A:
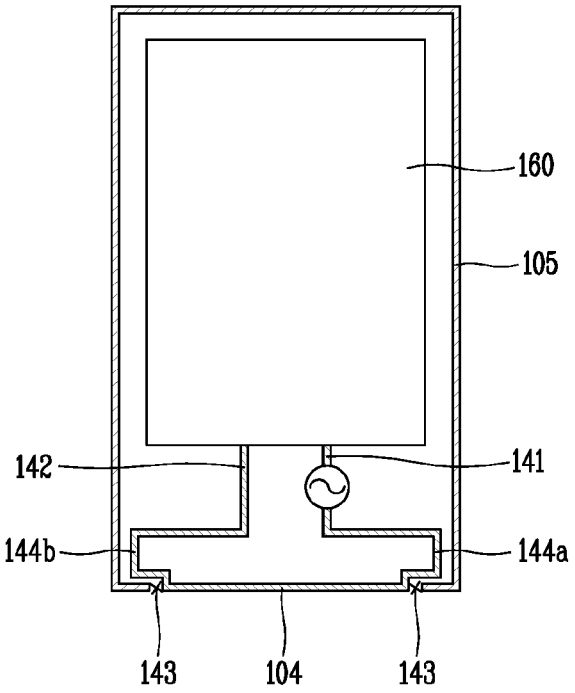
FIG. 5A through 5H are conceptual views of a loop antenna according to an embodiment of the present invention, illustrating the modified embodiment of each antenna, respectively.

According to the embodiment illustrated in FIG. 5A, a loop is formed from the power feed connecting portion 141 connected to the circuit board 160 to the ground connecting portion 142 through the patterns 144a, 144b and first member 104. The slit portions 143 are formed between the first member 104 and second member 105. In the loop antenna formed at a bottom end of the terminal, the primary radiation section may be formed to be directed to the outside in the length direction from the bottom end of the terminal, thereby reducing the deterioration of a radiation characteristic caused by an hand effect in a high-frequency band.

Figure 5B:
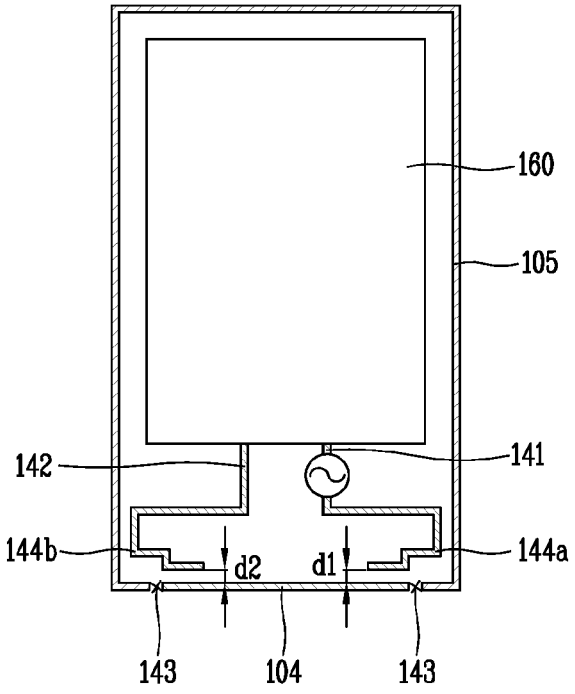

According to the embodiment illustrated in FIG. 5B, the patterns 144a, 144b and the first member 104 are separated from each other by a predetermined distance (d1, d2) to achieve coupling power feeding and coupling grounding. In the modified embodiment, a contact structure is not required to connect the first member 104 to the patterns, and thus the process may be simplified to reduce the unit cost. For example, only the first pattern 144a and the first member 104 are power fed by coupling, and the second pattern 144b and the first member 104 are directly brought into contact with each other to form a ground connection, and thus an electrical characteristic at an end of the loop structure will be fixed, thereby satisfying the broadband characteristic of an antenna.

Figure 5C:
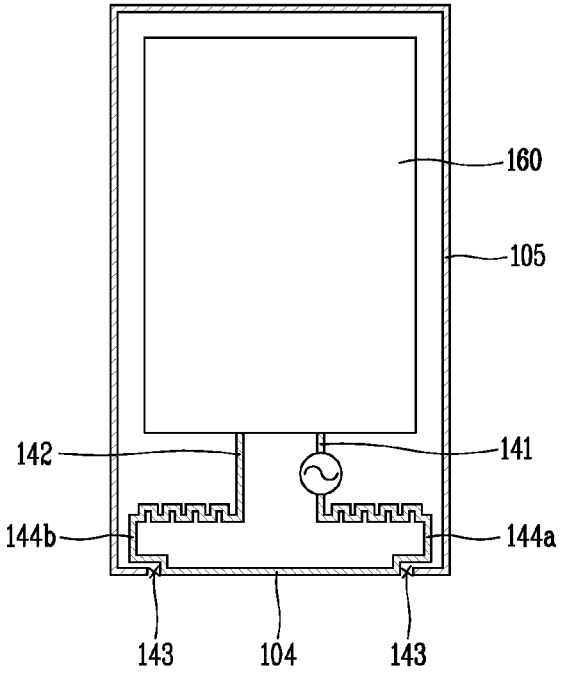

According to the embodiment illustrated in FIG. 5C, the patterns are formed in a meander structure to form a conductive pattern within a limited space, thereby further miniaturizing the antenna.

Figure 5D:
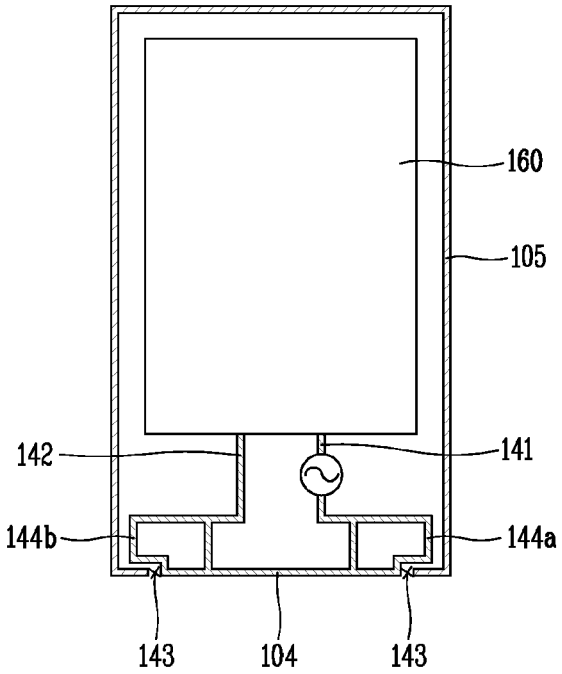

According to the embodiment illustrated in FIG. 5D, it may have a structure in which the patterns and the first member 104 are connected to each other, thereby providing a plurality of loops. As a result, it may be possible to transmit and receive radio signals corresponding to a plurality of frequencies required by the terminal as well as a specific frequency.

Figure 5E:
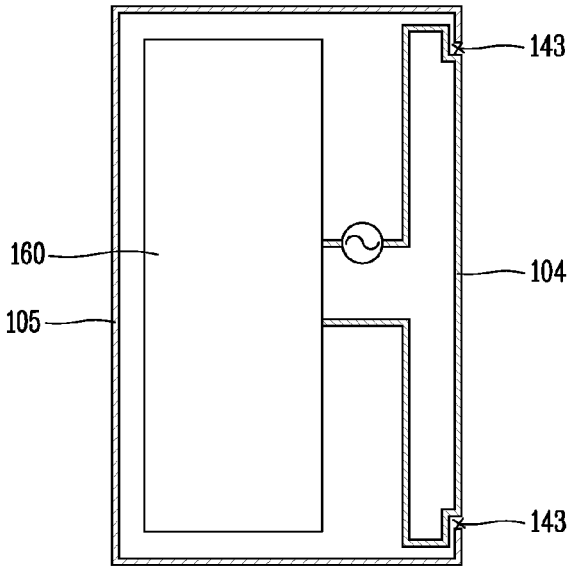

According to the embodiment illustrated in FIG. 5E, the first member 104 may be formed on the left or right side of the terminal as well as the top or bottom end thereof.

Figure 5F:
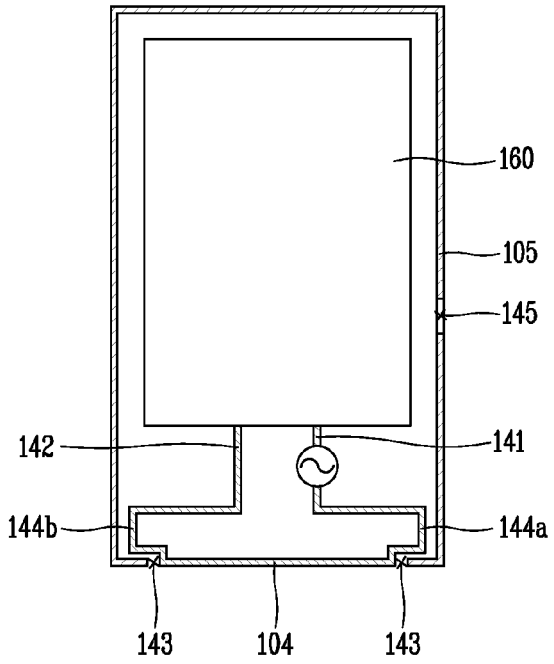
Figure 5G:
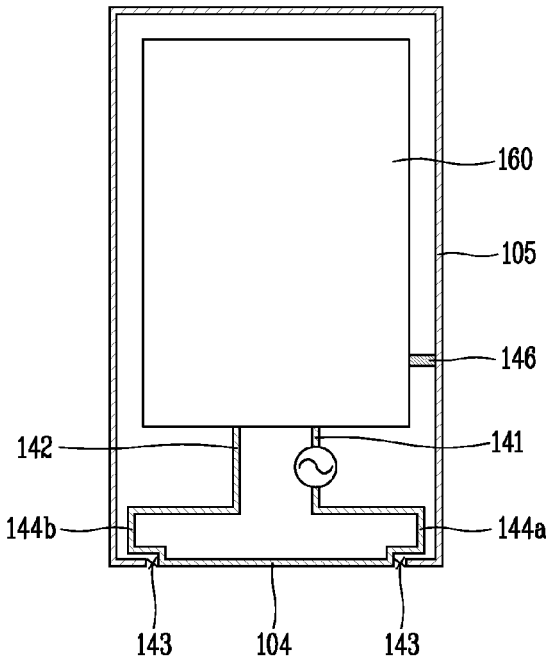

According to the embodiment illustrated in FIGS. 5F and 5G, at least one or more slits 145 are formed to communicate the inner and outer portion of the body to the second member 105, or the second member 105 and the circuit board 160 are electrically connected 146 to each other at least one or more points. Through this type of tuning, it may be possible to obtain a desired bandwidth and a desired resonance frequency.

Figure 5H:
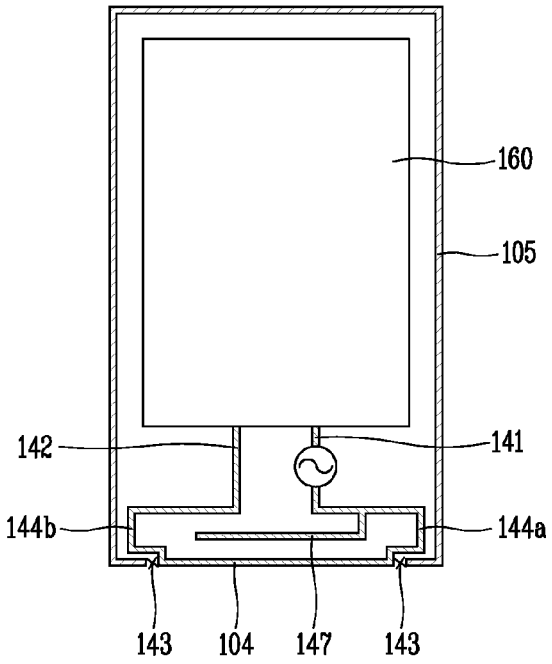

According to the embodiment illustrated in FIG. 5H, it may further include a sub radiator 147 extended from any one point of the patterns or extended from any one point of the first member 104 to expand the bandwidth at a specific frequency. In this case, the first member 104 may be operated as a main radiator for a specific frequency.

Figure 6:
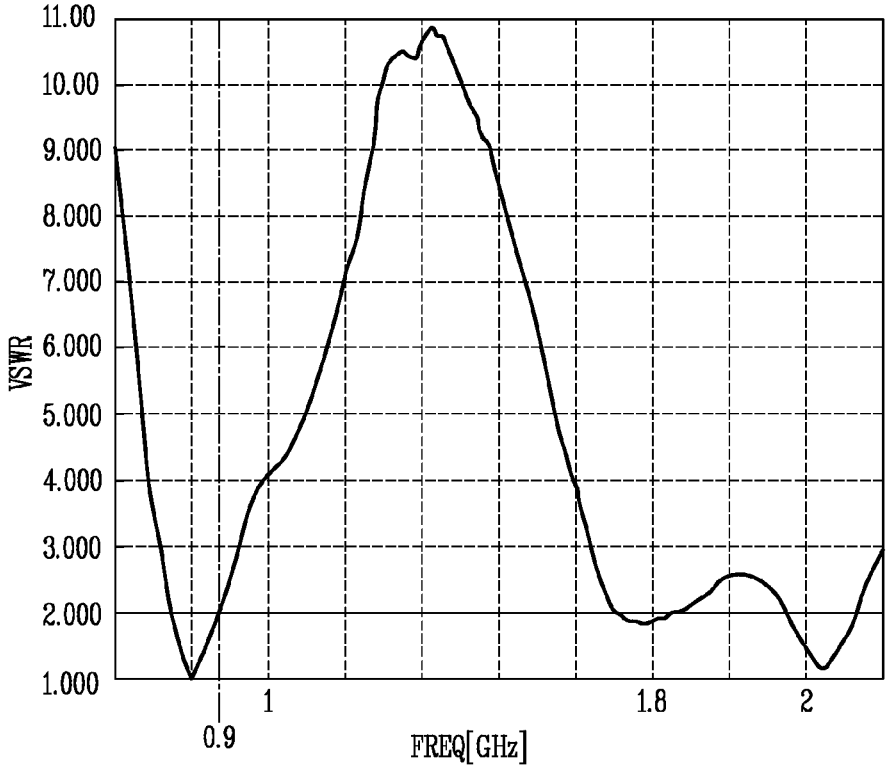
FIG. 6 is a graph illustrating a voltage standing wave ratio based on frequency in case of an antenna according to an embodiment of the present invention.

FIG. 6 is a graph illustrating a voltage standing wave ratio based on frequency in an antenna according to the embodiment of FIG. 5A. As illustrated in the drawing, the voltage standing wave ratio in a code division multiple access (CDMA) and global system for mobile (GSM) communication band (800-1000 MHz), a personal communication system (PCS) and digital cellular system (DCS) band (1700-1900 MHz), and a wideband CDMA (W-CDMA) communication band (2.4 GHz) is less than 3, respectively, and thus it is seen that the broadband characteristics at a radio frequency are excellent.

Embodiment 2

Figure 7:
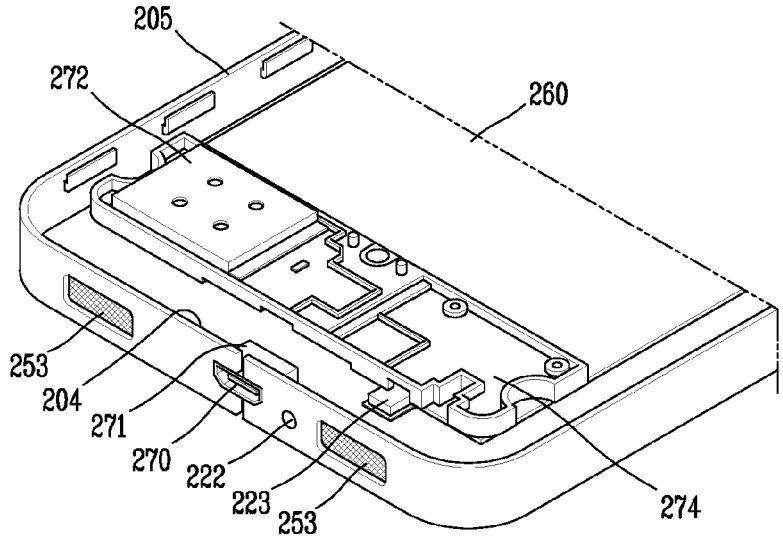
FIG. 7 is a perspective view illustrating a configuration in which a display unit is removed from the "A" portion of FIG. 1 according to another embodiment of the present invention.
Figure 8:
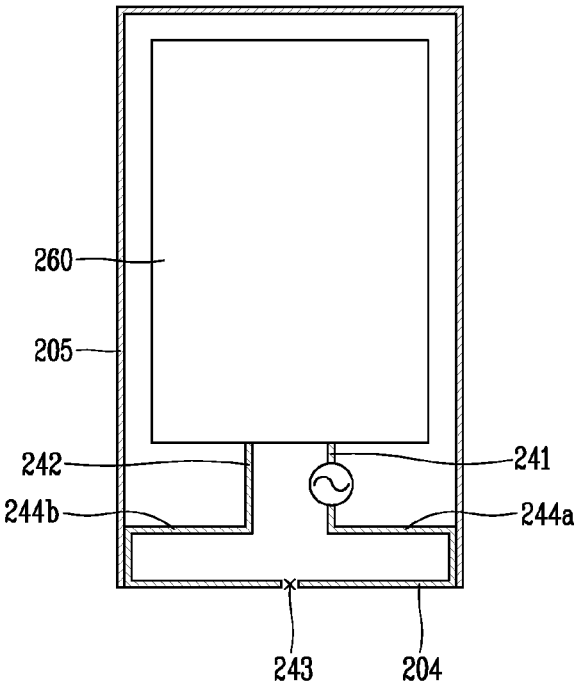
FIG. 8 is a conceptual view illustrating a loop antenna according to another embodiment of the present invention.

FIG. 7 is a perspective view illustrating a configuration in which a display unit is removed from the "A" portion of FIG. 1 according to another embodiment of the present invention, and FIG. 8 is a conceptual view illustrating a loop antenna according to another embodiment of the present invention.

As described above, according to the present embodiment, the same or similar reference numerals will be used to designate the same or similar elements, and the description thereof will be replaced with the foregoing description.

As illustrated in the drawing, a mobile terminal according to still another embodiment of the present invention is a mobile terminal having a loop antenna, and the loop antenna uses a portion of the case formed along a lateral surface of the terminal body as part of a conductive loop. In other words, a loop antenna according to an embodiment of the present disclosure forms a conductive loop together with a conductive member 204, a power feed connecting portion 241, a ground connecting portion 242, and a circuit board 260.

The conductive member 204 and the bezel member 205 are part of a cover forming an external appearance of the terminal, and disposed to cover a lateral surface of the circuit board 260. The conductive member 204 may be formed by including a conductive metal material, and operated as a main radiator in the loop antenna. Furthermore, at least part of the bezel member 205 may be made of a conductive metal material to form another conductive loop.

The conductive member 204 and the power feed connecting portion 241 are connected to a third pattern 244a, and the conductive member 204 and the ground connecting portion 242 are connected to a fourth pattern 244b. The patterns are formed on a carrier 274. The conductive member 204, the bezel member 205 and the patterns are combined with one another to form a conductive loop operated at any one of a code division multiple access (CDMA) and global system for mobile (GSM) communication band (800-1000 MHz), a personal communication system (PCS) and digital cellular system (DCS) band (1700-1900 MHz), and a wideband CDMA (W-CDMA) communication band (2.4 GHz), securing sufficient band characteristics, respectively. The conductive loop may be formed to satisfy a half wavelength of a specific frequency.

The third pattern 244a and the fourth pattern 244b may have a conductor in a meander type, and the conductor may be fabricated in various forms according to the resonance or frequency characteristics. A current is power fed to the conductor through the power feed connecting portion 241, and a current power fed through the ground connecting portion 242 is short circuited.

A through portion passed through at least part of the conductive member 204 to communicate the inner and outer portion of the body or a separate slit portion 243 configured to separate the conductive member 204 into a plurality of members are formed on the conductive member 204. Due to this, the conductive member 204 is combined together with the power feed connecting portion 241, the ground connecting portion 242, the bezel member 205, and the patterns to form at least one or more conductive loops capable of transmitting and receiving radio signals at a specific frequency.

As illustrated in FIG. 7, a speaker module 272, an interface module 271, or a microphone module 223 may be mounted at a location surrounded by the conductive member 204 and bezel member 205 and disposed adjacent to the conductive member 204. Furthermore, the speaker module 272, interface module 271, or microphone module 223 may be mounted on a carrier 274, and the carrier 274 may be disposed at the foregoing location.

At least one or holes communicated with the inner and outer portion of the body may be formed on the conductive member 204. A speaker 253 hole, an interface 270 housing, or a microphone 222 housing may be disposed on the hole.

Figure 9:
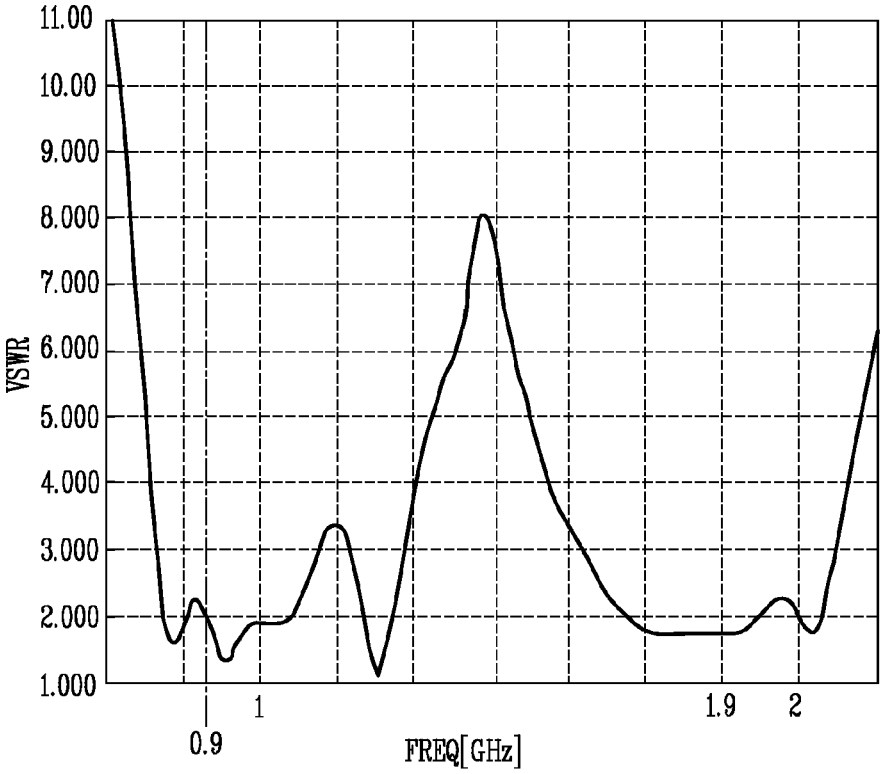
FIG. 9 is a graph illustrating a voltage standing wave ratio based on frequency in case of an antenna according to another embodiment of the present invention.

FIG. 9 is a graph illustrating a voltage standing wave ratio based on frequency in an antenna according to the embodiment of FIG. 8. As illustrated in the drawing, the voltage standing wave ratio in a code division multiple access (CDMA) and global system for mobile (GSM) communication band (800-1000 MHz), a personal communication system (PCS) and digital cellular system (DCS) band (1700-1900 MHz), and a wideband CDMA (W-CDMA) communication band (2.4 GHz) is less than 3, respectively, and thus it is seen that the broadband characteristics at a radio frequency are excellent.

The configurations and methods according to the above-described embodiments will not be applicable in a limited way to the foregoing mobile communication terminal, and all or part of each embodiment may be selectively combined and configured to make various modifications thereto.

What is claimed is:

[1. A mobile terminal comprising:

a circuit board;

at least one antenna pattern disposed inside of a case that forms an exterior of the mobile terminal such that no portion of the at least one antenna pattern is exposed externally, wherein the at least one antenna pattern is operable as a radiator;

a metal cover constructed as part of the case, the metal cover divided into a first member and a second member separated from the first member such that the first member does not contact the second member, wherein the first member is electrically connected to a part of the at least one antenna pattern without a contact structure between the first member and the part of the at least one antenna pattern, and wherein the first member and the second member are separated from each other by a first slit portion formed at a first end portion of the first member and a second slit portion formed at a second end portion of the first member;

a power feed connector for facilitating an electric power feed connection between the first member and the circuit board; and a ground connector for facilitating an electric ground connection between the first member and the circuit board, wherein the at least one antenna pattern is separated from the first member by a gap having a predetermined distance for coupling with the first member, and wherein the first slit portion and the second slit portion are configured to block a current flow from the first member to the second member.]

[2. The mobile terminal of claim 1, further comprising a speaker module, an interface module or a microphone module located in an area defined by the circuit board, the first member, and the second member.]

[3. The mobile terminal of claim 1, wherein the at least one antenna pattern comprises:

a first pattern extending from the power feed connector and forming a conductive loop, the first pattern separated from the first member by a gap having a predetermined distance for facilitating a coupling for power feeding.]

[4. The mobile terminal of claim 3, wherein the at least one antenna pattern further comprises:

a second pattern extending from the ground connector and forming a conductive loop, the second pattern separated from the first member by a gap having a predetermined distance for facilitating a coupling for grounding.]

[5. The mobile terminal of claim 1, wherein the power feed connector and the ground connector are disposed adjacent to each other.]

[6. The mobile terminal of claim 1, wherein the first member is operable as a main radiator and further comprises a sub-radiator for enhancing a radiation pattern of the main radiator, the sub-radiator having a predetermined length and extending from a portion of the first member.]

[7. The mobile terminal of claim 1, wherein the second member and the circuit board are electrically connected to each other at one or more points.]

[8. The mobile terminal of claim 1, wherein:

the power feed connector, the first member and the ground connector form a conductive loop; and the conductive loop has one or more paths that connect the power feed connector to the ground connector via the first member and that have a length of a half wavelength corresponding to a specific frequency.]

[9. A mobile terminal comprising:

a circuit board;

at least one antenna pattern disposed inside of a case that forms an exterior of the mobile terminal such that no portion of the at least one antenna pattern is exposed externally, wherein the at least one antenna pattern is operable as a radiator;

a metal cover constructed as part of the case forming an exterior of the mobile terminal, the metal cover divided into a conductive member and a bezel member separated from the conductive member such that the conductive member does not contact the bezel member, wherein the conductive member is electrically connected to a part of the at least one antenna pattern without a contact structure between the conductive member and the part of the at least one antenna pattern;

a power feed connector coupled with the conductive member;

a ground connector coupled with the conductive member and an embedded ground such that the ground connector, the conductive member and the power feed connector form a conductive loop, and either a through portion that is located at an end of the mobile terminal and passes through at least a portion of the conductive member in order to adjoin an interior and the exterior of the mobile terminal or a slit portion separating the conductive member into a plurality of members, wherein the at least one antenna pattern is separated from the conductive member by a gap having a predetermined distance for coupling with the conductive member, and wherein the through portion or the slot portion is configured to block a current flow from the conductive member to the bezel member.]

[10. The mobile terminal of claim 9, wherein the conductive loop has one or more paths connecting the power feed connector to the ground connector via the conductive member.]

[11. The mobile terminal of claim 10, wherein the one or more paths have a length of a half wavelength corresponding to a specific frequency.]

[12. The mobile terminal of claim 9, further comprising a speaker module, an interface module or a microphone module located adjacent to the conductive member.]

[13. The mobile terminal of claim 9, wherein the at least one antenna pattern comprises:

a first pattern extending from the power feed connector and further forming the conductive loop, the first pattern separated from the conductive member by a gap having a predetermined distance for facilitating a coupling for power feeding.]

[14. The mobile terminal of claim 13, wherein the at least one antenna pattern further comprises:

a second pattern extending from the ground connector and further forming the conductive loop, the second pattern separated from the conductive member by a gap having a predetermined distance for facilitating a coupling for grounding.]

[15. The mobile terminal of claim 14, wherein the power feed connector and the ground connector are disposed adjacent to each other.]

[16. The mobile terminal of claim 9, wherein the conductive member is operated as a main radiator and further comprises a sub-radiator for enhancing a radiation pattern of the main radiator, the sub-radiator having a predetermined length and extending from a portion of the conductive member.]

[17. The mobile terminal of claim 9, wherein the bezel member is disposed to cover a lateral surface of the mobile terminal not covered by the conductive member.]

[18. The mobile terminal of claim 17, wherein the bezel member has one or more slits adjoining the interior and the exterior of the mobile terminal.]

[19. The mobile terminal of claim 17, wherein the bezel member and the circuit board are electrically connected to each other at one or more points.]

[20. The mobile terminal of claim 2, wherein the first member has at least one hole adjoining an interior and the exterior of the mobile terminal.]

[21. The mobile terminal of claim 20, further comprising:

a speaker hole, an interface housing or a microphone housing disposed at the at least one hole.]

[22. The mobile terminal of claim 1, wherein the first member is formed at a bottom end of the case.]

[23. The mobile terminal of claim 12, wherein the conductive member has at least one hole adjoining the interior and the exterior of the mobile terminal.]

[24. The mobile terminal of claim 23, further comprising:

a speaker hole, an interface housing, or a microphone housing disposed at the at least one hole.]

[25. The mobile terminal of claim 9, wherein the conductive member is formed at a bottom end of the case.]

*26. A mobile terminal comprising:*

*a circuit board;*

*an antenna configured to transceive radio signals; and*

*a case having two long lateral surfaces and two short lateral surfaces which form an appearance of the mobile terminal, the case comprising a metal material,*

*wherein the case comprises:*

*a first conductive member being a first part of a bottom lateral surface of the case;*

*a second conductive member being a second part and a third part of the bottom lateral surface of the case,*

*wherein the second conductive member is separated from the first conductive member such that the first conductive member does not contact the second conductive member;*

*a first slit portion located at a first end of the first conductive member; and*

*a second slit portion located at a second end of the first conductive member, the second end being opposite to the first end of the first conductive member,*

*wherein the first slit portion and the second slit portion are located at the bottom lateral surface of the case,*

*wherein the antenna comprises:*

*the first conductive member forming a radiator of the antenna;*

*a power feed connecting portion electrically connecting the first conductive member with the circuit board; and*

*a ground connecting portion electrically ground-connecting the first conductive member with the circuit board, such that the power feed connecting portion, the first conductive member and the ground connecting portion form a conductive loop for transceiving the radio signals,*

*wherein the power feed connecting portion and the ground connecting portion of the antenna are not exposed externally,*

*wherein the first conductive member includes an inner surface and an outer surface in which the inner surface is not exposed externally and the outer surface is exposed externally,*

*wherein the second conductive member includes an inner surface and an outer surface in which the inner surface is not exposed externally and the outer surface is exposed externally,*

*wherein the first conductive member, the first slit portion and the second slit portion are located at the bottom lateral surface of the case so the antenna radiates the radio signals to an outside of the mobile terminal,*

*wherein the first part and the second part of the bottom lateral surface of the case are separated by the first slit portion, and*

*wherein the first part and the third part of the bottom lateral surface of the case are separated by the second slit portion.*

*27. The mobile terminal of claim 26, wherein a radiation section of the antenna is directed to the outside of the mobile terminal in a length direction from the one of the two short lateral surfaces of the case to reduce a deterioration of a radiation characteristic caused by a hand holding the mobile terminal.*

*28. The mobile terminal of claim 26, wherein a first long lateral surface of the case connects with the second part of the second conductive member being adjacent to the first end of the first conductive member, and*

*wherein the first conductive member and the second part of the second conductive member are separated by the first slit portion.*

*29. The mobile terminal of claim 28, wherein a second long lateral surface of the case connects with the third part of the second conductive member being adjacent to the second end of the first conductive member, and*

*wherein the first conductive member and the third part of the second conductive member are separated by the second slit portion.*

*30. The mobile terminal of claim 26, wherein each of the first slit portion and the second slit portion has two long sides and two short sides,*

*wherein the two short sides of the first slit portion and the second slit portion are open areas having no metal material of the case, and*

*wherein one of the two long sides of the first slit portion and the second slit portion adjoins the first conductive member of the case and the other one of the two long sides of the first slit portion and the second slit portion adjoins the second conductive member of the case.*

*31. The mobile terminal of claim 30, wherein the two long sides of the first slit portion and the second slit portion are located in a y-axis thickness direction of the mobile terminal, and*

*wherein the two short sides of the first slit portion and the second slit portion are located in an x-axis width direction of the mobile terminal.*

*32. The mobile terminal of claim 26, wherein the second conductive member and a ground of the circuit board are electrically connected to each other.*

*33. The mobile terminal of claim 26, wherein the ground connecting portion includes at least two paths having a different length, and a switch to be connected with the different length of the at least two paths in a selective manner.*

*34. The mobile terminal of claim 26, wherein the first conductive member includes at least one hole penetrating the inner surface and the outer surface of the first conductive member.*

*35. The mobile terminal according to claim 34, further comprising:*

*a speaker, an interface or a microphone disposed adjacent to the first conductive member including the at least one hole.*

*36. The mobile terminal of claim 26, further comprising:*

*a display disposed at a front side of the mobile terminal,*

*wherein a screen of the display occupies most of the front side of the mobile terminal.*

*37. The mobile terminal of claim 26, wherein each of the first slit portion and the second slit portion is not filled with the metal material of the case.*

*38. A mobile terminal comprising:*

*a circuit board;*

*an antenna configured to transceive radio signals; and*

*a case having two long lateral surfaces and two short lateral surfaces which form an appearance of the mobile terminal, the case comprising a metal material,*

*wherein the case comprises:*

*a first conductive member being a first part of a bottom lateral surface of the case;*

*a second conductive member being a second part and a third part of the bottom lateral surface of the case,*

*wherein the second part is connected to a first long lateral surface of the case and the third part is connected to a second long lateral surface of the case, and*

*wherein the second conductive member is separated from the first conductive member such that the first conductive member does not contact the second conductive member;*

*a first slit portion located at a first end of the first conductive member; and*

*a second slit portion located at a second end of the first conductive member, the second end being opposite to the first end of the first conductive member,*

*wherein the first slit portion and the second slit portion are located at the bottom lateral surface of the case,*

*wherein the antenna comprises:*

*the first conductive member forming a radiator of the antenna;*

*a power feed connecting portion electrically connecting the first conductive member with the circuit board; and*

*a ground connecting portion electrically ground-connecting the first conductive member with the circuit board, such that the power feed connecting portion, the first conductive member and the ground connecting portion form a conductive loop for transceiving the radio signals,*

*wherein the power feed connecting portion and the ground connecting portion of the antenna are not exposed externally,*

*wherein the first conductive member includes an inner surface and an outer surface in which the inner surface is not exposed externally and the outer surface is exposed externally,*

*wherein the second conductive member includes an inner surface and an outer surface in which the inner surface is not exposed externally and the outer surface is exposed externally,*

*wherein the first conductive member, the first slit portion and the second slit portion are located at the bottom lateral surface of the case so the antenna radiates the radio signals to an outside of the mobile terminal,*

*wherein the first part and the second part of the bottom lateral surface of the case are separated by the first slit portion, and*

*wherein the first part and the third part of the bottom lateral surface of the case are separated by the second slit portion.*

*39. The mobile terminal of claim 38, wherein the second conductive member and a ground of the circuit board are electrically connected to each other.*

*40. The mobile terminal of claim 38, wherein the ground connecting portion includes at least two paths having a different length, and a switch to be connected with the different length of the at least two paths in a selective manner.*

*41. The mobile terminal of claim 38, wherein the first conductive member includes at least one hole penetrating the inner surface and the outer surface of the first conductive member.*

*42. The mobile terminal according to claim 41, further comprising:*

*a speaker, an interface or a microphone disposed adjacent to the first conductive member including the at least one hole.*

*43. The mobile terminal of claim 38, further comprising:*

*a display disposed at a front side of the mobile terminal,*

*wherein a screen of the display occupies most of the front side of the mobile terminal.*

*44. The mobile terminal of claim 38, wherein each of the first slit portion and the second slit portion is not filled with the metal material of the case.*

*45. A mobile terminal comprising:*

*a display disposed at a front side of the mobile terminal, wherein a screen of the display occupies most of the front side of the mobile terminal;*

*an interface;*

*a circuit board;*

*an antenna configured to transceive radio signals; and*

*a case having two long lateral surfaces and two short lateral surfaces which form an appearance of the mobile terminal, the case comprising a metal material,*

*wherein the case comprises:*

*a first conductive member being a first part of a bottom lateral surface of the case;*

*a second conductive member being a second part and a third part of the bottom lateral surface of the case,*

*wherein the second part is connected to a first long lateral surface of the case and the third part is connected to a second long lateral surface of the case, and*

*wherein the second conductive member is separated from the first conductive member such that the first conductive member does not contact the second conductive member;*

*a first slit portion located at a first end of the first conductive member; and*

*a second slit portion located at a second end of the first conductive member, the second end being opposite to the first end of the first conductive member,*

*wherein the first slit portion and the second slit portion are located at the bottom lateral surface of the case,*

*wherein the antenna comprises:*

*the first conductive member forming a radiator of the antenna;*

*a power feed connecting portion electrically connecting the first conductive member with the circuit board; and*

*a ground connecting portion electrically ground-connecting the first conductive member with the circuit board, such that the power feed connecting portion, the first conductive member and the ground connecting portion form a conductive loop for transceiving the radio signals,*

*wherein the power feed connecting portion and the ground connecting portion of the antenna are not exposed externally,*

*wherein the first conductive member includes an inner surface and an outer surface in which the inner surface is not exposed externally and the outer surface is exposed externally,*

*wherein the second conductive member includes an inner surface and an outer surface in which the inner surface is not exposed externally and the outer surface is exposed externally,*

*wherein the first conductive member, the first slit portion and the second slit portion are located at the bottom lateral surface of the case so the antenna radiates the radio signals to an outside of the mobile terminal,*

*wherein the first part and the second part of the bottom lateral surface of the case are separated by the first slit portion,*

*wherein the first part and the third part of the bottom lateral surface of the case are separated by the second slit portion,*

*wherein the first conductive member includes at least one hole penetrating the inner surface and the outer surface of the first conductive member, and*

*wherein the interface is disposed adjacent to the at least one hole of the first conductive member.*

*46. The mobile terminal of claim 45, wherein each of the first slit portion and the second slit portion is not filled with the metal material of the case.*

* * * * *